United States Patent [19]

Krapfenbauer

[11] Patent Number: 4,796,345
[45] Date of Patent: Jan. 10, 1989

[54] METHOD OF FABRICATING A RIM GEAR, SUCH AS A STARTER RIM GEAR MADE OF SHEET METAL

[75] Inventor: Hans Krapfenbauer, Zürich, Switzerland

[73] Assignee: Ernst Grob AG, Männedorf, Switzerland

[21] Appl. No.: 75,123

[22] Filed: Jul. 20, 1987

[30] Foreign Application Priority Data

Jul. 24, 1986 [CH] Switzerland .................. 02966/86

[51] Int. Cl.$^4$ .......................................... B21D 53/28
[52] U.S. Cl. .................................... 29/159.2; 74/438
[58] Field of Search .............. 29/159.2; 74/438, 449, 74/457, 460, 462

[56] References Cited

U.S. PATENT DOCUMENTS

| | | | |
|---|---|---|---|
| 3,745,851 | 7/1973 | Zeldman et al. | 29/159.2 |
| 4,470,290 | 9/1984 | Jungesjo | 29/159.2 |
| 4,547,179 | 10/1985 | Ohhashi | 29/159.2 |

Primary Examiner—P. W. Echols
Attorney, Agent, or Firm—Werner W. Kleeman

[57] ABSTRACT

The method of fabricating a rim gear, such as a starter rim gear made of sheet metal, such as sheet steel, comprises cold forming an outer surface of a substantially cylindrical rim portion of a dished blank according to the well known Grob method to effect an external or exterior gear tooth system with proper gear or gear wheel characteristics thereon, thereby also effecting an internal or inner tooth system on the inner surface of the substantially cylindrical rim portion. This method is performed such that at the fabricated rim gear the quotient of the different between an addendum circle diameter or outer diameter of the external gear tooth system and a crown circle diameter or inner diameter of the internal tooth system divided by the wall thickness of the substantially cylindrical rim portion before the start of cold forming is at least 1.6 and that the quotient of the thinnest portion of the tooth flank wall of the fabricated rim gear divided by that wall thickness is at most 0.4. By appropriately reducing the thickness of the material blank at the region of the free edge of its substantially cylindrical rim portion it is possible to at least partially precompensate the formation of undesired beading or axial beads laterally of the formed rim gear teeth. This member of fabrication also ensures that sheet metal can be used which is susceptible to surface hardening, for example, induction hardening. High quality fabrication is now possible in an economical, advantageous and reproducible manner with only a minimum of empirical work involved, thereby avoiding the innumerable trials heretofore required.

4 Claims, 3 Drawing Sheets

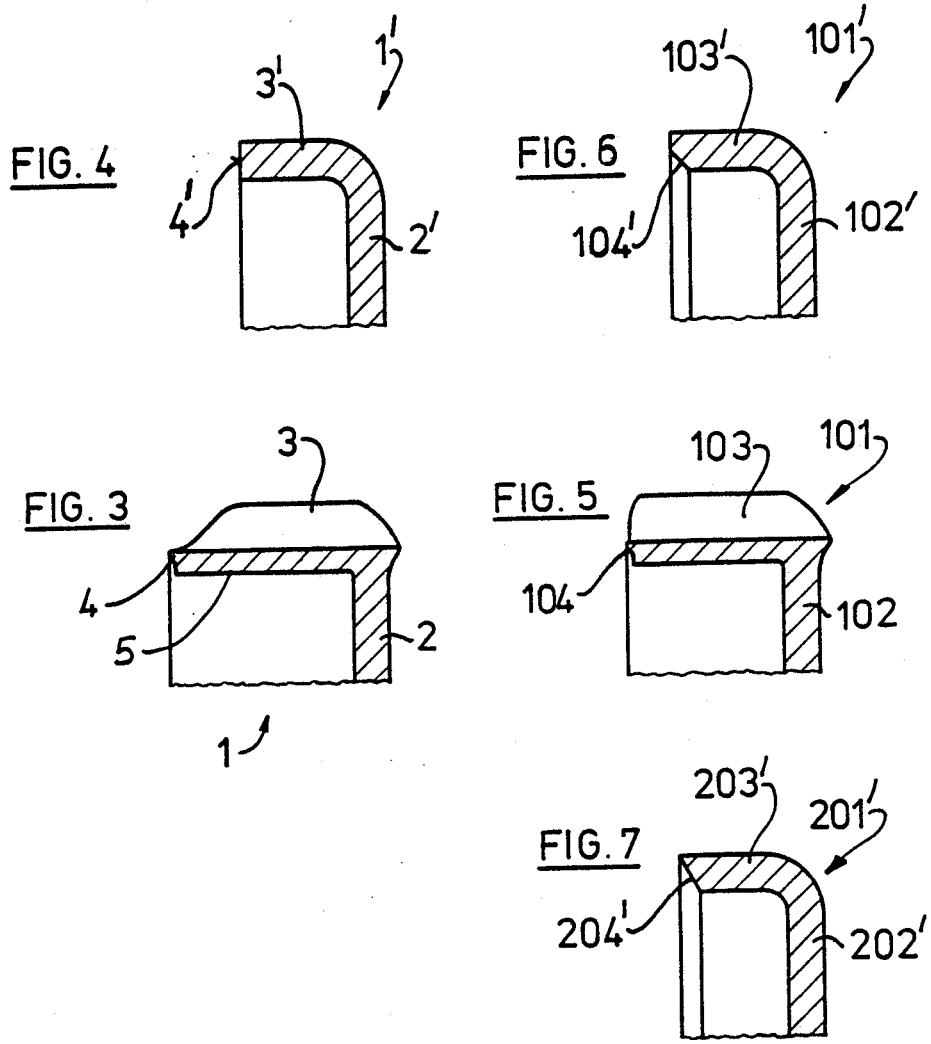

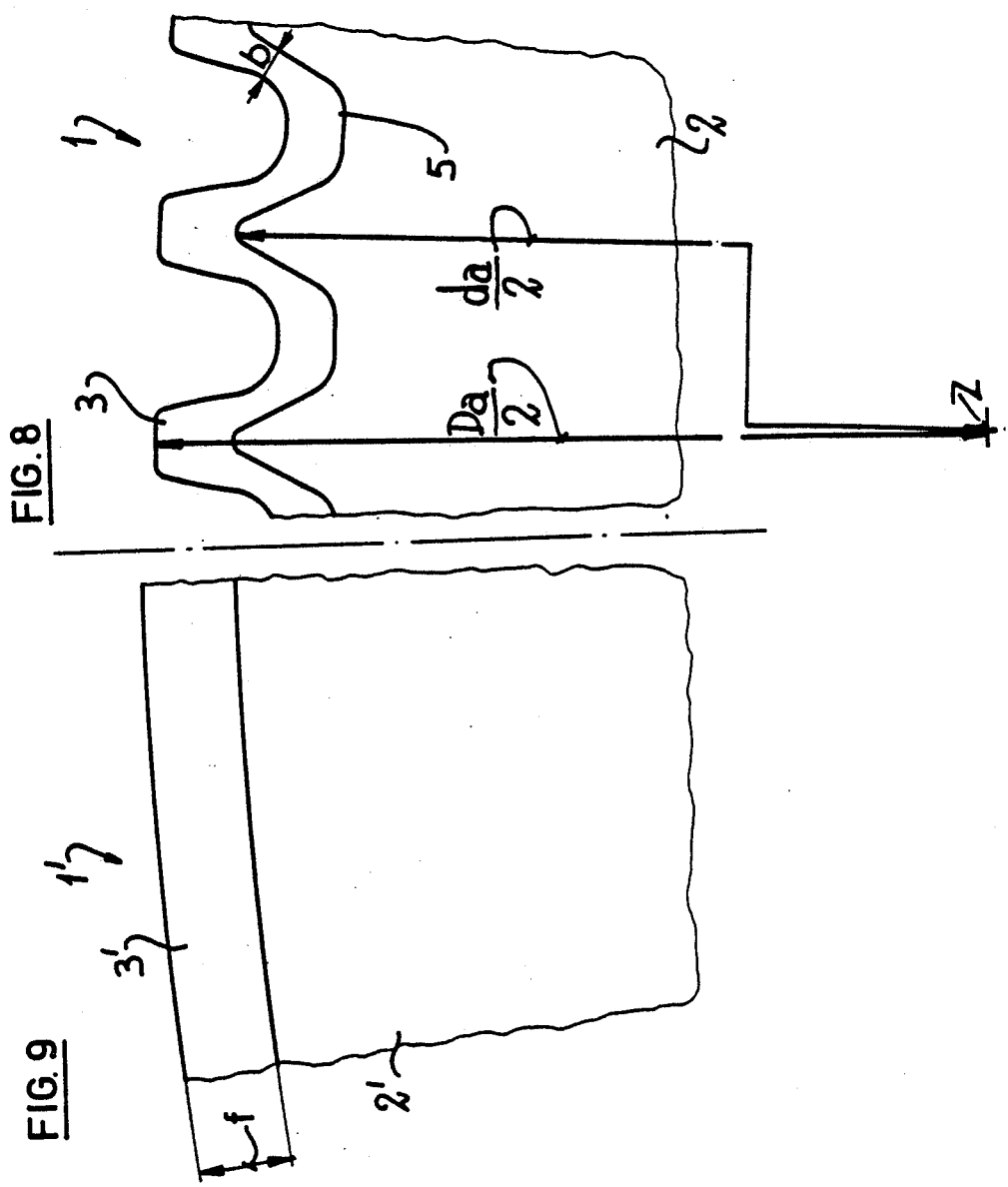

४,७९६,३४५

METHOD OF FABRICATING A RIM GEAR, SUCH AS A STARTER RIM GEAR MADE OF SHEET METAL

BACKGROUND OF THE INVENTION

The present invention broadly relates to a method for fabricating a rim gear and, more specifically, pertains to a new and improved method for fabricating in particular, but not exclusively, a starter rim gear. The present invention further relates to a rim gear produced in accordance with this method.

Generally speaking, the method of the present invention for fabricating rim gears, particularly starter rim gears and the like from sheet metal, such as sheet steel or steel plating, comprises the step of providing a dished blank having a substantially cylindrical rim portion extending substantially parallel to the axis of rotation of the dished blank at one side thereof and the step of cold forming an outer surface of the substantially cylindrical rim portion according to the well known Grob method to effect on the outer surface an external gear tooth system or toothed profile having proper gear wheel or gear characteristics thereon, thereby also effecting an internal gear tooth system or toothed profile on the inner surface of the substantially cylindrical rim portion.

In order to avoid any misunderstandings from the outset, the well known Grob method of cold forming or cold working will be here briefly elucidated, even though this method is extensively known in the cold forming art from documentation as well as from practice:

This method simultaneously generates both an outside profile and an inside profile, which can be different from one another. The workpiece, in this application the tubular or substantially cylindrical rim part, is mounted onto a mandrel or plug corresponding to the inner profile. The workpiece then has imparted thereto a workpiece feed by axially moving it and rotating it about its lengthwise axis. During this time the workpiece is externally worked by annularly or ring-like profiled forming rolls or rolling tools, whereby each forming roll or rolling tool performs or carries out single or individual impacting forming operations or blows in rapid succession or sequence, which operations are synchronized with or accommodated to the pitch of the profile or toothing and the feed of the workpiece. These single impacting forming operations or blows are accomplished or carried out in the same sense of direction and predominantly in the lengthwise direction of the profile. The individual or single impacting forming operations or blows consecutively carried out by the same forming roll or rolling tool lie in a helical or screw-like zone. This helical or screw-like zone is determined by the feed of the workpiece. Seen in the lengthwise direction of the profile or toothing, the individual, consecutive impacting forming operations or blows in the same tooth gap partially overlap each other. During each single impacting forming operation or blow, material along a relatively small section of the workpiece is pushed into one of the depressions of the mandrel, mainly flowing in a radial direction. A method of this kind pertaining or directed to relatively thick-walled workpieces is disclosed in Swiss Pat. No. 579,427, in French Pat. No. 7,538,539 and in German Patent Publication No. 2,549,230. Also significant to the Grob method or process is the disclosure of German Pat. No. 1,016,222, published Sept. 26, 1957, the disclosure of which is incorporated herein by reference.

The designation "starter" stands in most cases for a device which sets, for example, combustion engines in motion.

Motor vehicles and, in particular, automobiles or cars are generally equipped with electric gear wheel cranking starters. This kind of starter works in conjunction with a car battery powering an electric motor and drives a pinion. During the starting operation, this pinion is meshed with a starter gear wheel attached to the engine or flywheel of the engine.

It is therefore necessary that starter gear wheels possess proper gear or gear wheel characteristics.

In contrast to other sheet metal gear transmissions used in motor vehicles, such as toothed belt pulleys, clutch discs and splined tubing, the gear tooth system of the rim gear wheel according to this invention features real gear wheel geometry or gear wheel characteristics, that is to say, real gear wheels or gears in the sense that they have relatively high tooth heights (radially measured) and small tooth flank widths (axially measured) for precise meshing with another gear such as required for starter gear wheels or gears which are intended to mesh with another gear, namely the associated pinion.

These special requirements often cause difficulties during manufacture of sheet metal starter gear wheels according to the Grob method.

SUMMARY OF THE INVENTION

Therefore, with the foregoing in mind, it is a primary object of the present invention to provide a new and improved method for fabricating a rim gear, especially a starter rim gear, which does not exhibit the aforementioned drawbacks and shortcomings of the prior art method.

Another and more specific object of the present invention aims at improving the known Grob method in such a manner that the rim gears, in particular for instance the starter rim gears formed or fabricated according to this Grob method can be made in a more efficient, advantageous and economical way entailing a better reproducibility and reducing the empirical work or experimentation to a minimum.

Now in order to implement these and still further objects of the present invention, which will become more readily apparent as the description proceeds, the method of the present invention is manifested by the steps of cold forming the outer surface of the substantially cylindrical rim portion of the dished blank thereby reducing the outside or external diameter thereof such that the quotient of the difference between an addendum circle diameter or outer diameter of the exterior or external gear tooth system of the fabricated rim gear and a crown circle diameter or inner diameter of the internal tooth system or toothed profile of the fabricated rim gear divided by the wall thickness of the substantially cylindrical rim portion of the dished blank before the start of the cold forming is at least 1.6 and such that the quotient of the thinnest portion of the tooth flank wall of the fabricated rim gear divided by the wall thickness of the substantially cylindrical rim portion of the dished blank is at most 0.4.

Previously it had been necessary, even when the blanks were made of otherwise well suited sheet steel, to conduct innumerable trials until the hoped-for reproducible dimensions were attained or worked out. Predicting suitable parameters seemed impossible.

According to the invention, it is now unexpectedly possible to reduce the empirical work or experimentation to the minimum possible in such technology.

During the development of the inventive method it was found that it was possible to avoid at least in part or totally the usual beads or bulges at the lateral edge of the toothing or tooth system. These beads or bulges were sometimes found disturbing and had to be removed by a turning or other appropriate machining operation.

According to a preferred embodiment of the invention, these bulges or beads can be at least partially pre-compensated for, in that the wall thickness of the substantially cylindrical rim part of the dished blank is locally reduced. Such a measure was out of the question when the heretofore experienced difficulties were taken into account.

In case this kind of suppression of the beads or bulges is still considered to be disturbing, at least the necessary turning or machining operation can be more conveniently performed and in a shorter length of time than in heretofore employed methods.

In the past there were also additional problems when using surface-hardened sheet steel, which problems are now reduced by the present invention.

It is therefore now possible to use a sufficiently cold formable or workable yet subsequently surface-hardenable (for example, by induction hardening) sheet metal, such as sheet steel or steel plating.

A starter rim gear made of sheet steel or steel plating according to the inventive method can therefore be fabricated in a reliably reproducible manner, which is an economical advantage, and furthermore there is the advantage of higher precision and increased durability.

A starter rim gear fabricated according to the inventive method in accordance with one of the preferred embodiments will satisfy the highest demands.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 3 shows an enlarged detail of FIG. 2 in the region of the toothing or tooth system;

FIG. 4 shows a detail of the blank used for producing the starter rim gear according to FIG. 3;

FIG. 5 shows a detailed section, comparable to FIG. 3, but showing another embodiment of the toothing or tooth system;

FIG. 6 shows a detailed part of the blank used for producing the starter rim gear according to FIG. 5;

FIG. 7 shows an alternative embodiment to that of FIG. 6;

FIG. 8 shows an enlarged fragmentary view of the toothing or tooth system of the gear or gear wheel corresponding to FIG. 1; and FIG. 9 shows an enlarged fragmentary view of the blank used to form the toothing or tooth system of the gear wheel of FIG. 8.

DETAILED DESCRIPTION OF THE PREFERRED EMBODIMENTS

Figure 1:
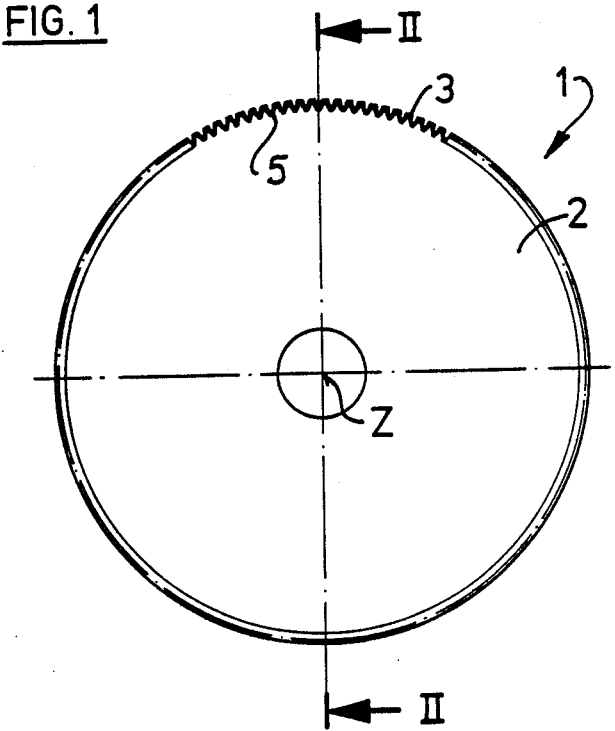
FIG. 1 shows a front view of a starter rim gear fabricated according to the invention.
Figure 2:
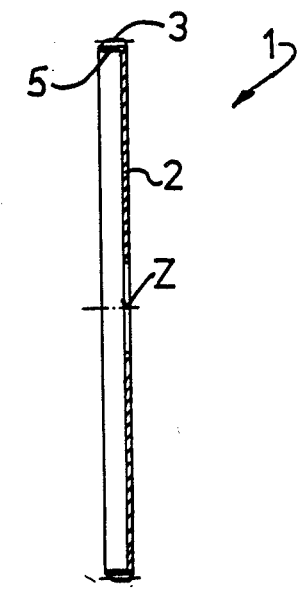
FIG. 2 shows a sectional view taken substantially along line II—II in FIG. 1.

Describing now the drawings, it is to be understood that to simplify the showing thereof only enough of the structure of the rim gear, such as the exemplary considered starter rim gear, has been illustrated therein as is needed to enable one skilled in the art to readily understand the underlying principles and concepts of the present invention. Turning now specifically to the drawings, the finished starter rim gear 1 according to FIGS. 1, 2, 3 and 8 has been generally fabricated according to the above-described Grob method or process. The starting material is a blank 1' having a slightly oversize outside diameter and a dished shape. The dished blank 1' possesses a web portion 2' and a substantially cylindrical or tubular rim portion 3' having an edge or end surface 4' thereon.

Inserted into this blank 1' was a suitable mandrel (not shown) having an outside profile generally corresponding to the internal or inside toothed profile or internal or inner tooth system 5 formed on the side of the inner surface of the substantially cylindrical rim portion 3' of the blank 1' (see FIG. 9). Cold working was carried out or performed on the outer surface of the substantially cylindrical rim portion 3' according to the above-described Grob method with forming rolls or rolling tools having an annular or ring-like profile corresponding to the external toothing or gear tooth system 3.

The result was a workpiece 1 which is illustrated in the drawings and contains a flat web portion 2 and a round aperture or opening located around a centering point or center Z. Although the web portion 2 has been shown flat in order not to complicate the drawing, it is to be understood that this web portion 2 can be of a corrugated configuration in order to obtain the required stiffness or rigidity.

As is clearly shown, especially in FIGS. 3 and 8, the toothing or tooth system is fairly high (measured in a radial direction) but the tooth flanks are rather narrow (axially measured), as is usual with starter rim gears. It should also be clear that the fine details of the gear wheel toothing or tooth system have not been shown in the drawings to simplify the illustration.

If the bead or bulge 4 as shown in FIG. 3 is not required, it can be turned off or otherwise machined in a final operation. A preferred embodiment of the invention is shown in FIG. 5 with a toothing or gear tooth system 103 of a workpiece 101 with only a small bead or bulge 104. The web portion is designated with the reference numeral 102, which web portion 102 can be obtained from a precorrected dished blank 101' having a web portion 102' and a substantially cylindrical rim portion 103' with a precompensating chamfer or bevel 104' on the inside edge of the substantially cylindrical rim portion 103' as illustrated in FIG. 6. An alternative hereto is a dished blank 201' such as is shown in FIG. 7 with a web portion 202' and a substantially cylindrical rim portion 203', an edge or end surface 204' of which is beveled or chamfered over the whole rim thickness. This reduction in the material of the substantially cylindrical rim portion 203' can also have any other shape, for example, a groove or hollow filet.

Referring now to FIGS. 8 and 9, the distance between the center or centering point Z and the addendum or tip circle of the external gear tooth system 3 having proper gear wheel or gear characteristics and formed on the side of the outer surface of the substantially cylindrical rim portion 3= is designated by Da/2. The distance between the center or centering point Z and the inner or crown circle of the inner toothed profile or the gear tooth system 5 formed on the side of the inner surface of the substantially cylindrical rim portion 3' confronting the center or centering point Z is designated by da/2. The reference character f designates the thickness of the substantially cylindrical or tubular rim portion 3' of the blank 1' before the start of the cold forming operation as shown in FIG. 9. The reference character b designates the thickness of the thinnest portion between a tooth flank of the exterior or external gear tooth system 3 formed on the side of the outer surface of the substantially cylindrical rim portion 3' and a corresponding tooth flank of the interior or internal gear tooth system 5 formed on the side of the inner surface of the substantially cylindrical rim portion 3'.

The above-mentioned forming rolls or rolling tools together with the aforementioned mandrel conjointly cold form or shape or cold work the dished blank 1' according to the invention thereby reducing the outside diameter of the dished blank 1'. This is performed such that the quotient of the division of the difference or subtraction between the addendum circle diameter Da and the inner or crown circle diameter da divided by the wall thickness f of the substantially cylindrical rim portion 3' of the blank 1' amounts to the value of at least 1.6 and such that at the same time the quotient of the division of the thinnest portion b of a tooth flank between the outer or external gear toothing 3 and the inner or internal toothed profile or gear tooth system 5 divided by the thickness f of the substantially cylindrical rim portion 3' of the blank 1' amounts to a maximum value of 0.4.

In this way it is ensured that a rational fabrication produces reproducible results, and independent of the presence or absence of a bead or bulge 4 as shown in FIG. 3.

Also, this manner of fabrication ensures that sheet steel or steel plating can be used which are susceptible to surface hardening, for example, by means of induction hardening, without having to accept disadvantages during the cold forming or cold working operation. Simple tests will bring about or lead to the ideal limiting conditions.

While there are shown and described present preferred embodiments of the invention, it is to be distinctly understood that the invention is not limited thereto, but may be otherwise variously embodied and practiced within the scope of the following claims.

Accordingly, what I claim is:

1. A method of fabricating a rim gear, especially a starter rim gear, made of sheet metal, comprising the steps of:
   cold forming a substantially cylindrical rim portion of a dished blank according to the Grob method to produce a gear tooth system possessing predetermined gear wheel meshing characteristics and containing an external gear tooth system and an internal gear tooth system;
   said step of cold forming entailing reducing an outside diameter of said substantially cylindrical rim portion of said dished blank such that:
   (a) the quotient of the difference between an addendum circle diameter of said external gear tooth system of the fabricated rim gear and a crown circle diameter of said internal gear tooth system of the fabricated rim gear divided by a predeterminate wall thickness of said substantially cylindrical rim portion of said dished blank before said step of cold forming is at least 1.6; and
   (b) the quotient of a thinnest portion of a tooth flank wall of the fabricated rim gear divided by said predeterminate wall thickness of said substantially cylindrical rim portion of said dished blank before said step of cold forming is at most 0.4.

2. The method as defined in claim 1, further including the step of:
   applying a precompensation by locally reducing said predeterminate wall thickness of said substantially cylindrical rim portion of said dished blank before said step of cold forming in order to at least reduce undesirable formation of axial beads laterally of said external and internal gear tooth systems.

3. The method as defined in claim 1, wherein:
   said sheet metal comprises surface hardenable sheet steel; and
   said external and internal gear tooth systems are surface hardened.

4. A method of fabricating a rim gear, comprising the steps of:
   cold forming a substantially tubular rim portion of a dished blank to produce a gear tooth system possessing predetermined gear wheel meshing characteristics and containing an external gear tooth system and an internal gear tooth system on an inner surface of said substantially cylindrical rim portion;
   said step of cold forming entailing reducing an outside diameter of said substantially tubular rim portion of said dished blank such that:
   (a) the quotient of the difference between an addendum circle diameter of said external gear tooth system of the fabricated rim gear and an inner diameter of said internal gear tooth system of the fabricated rim gear divided by a predeterminate wall thickness of said substantially tubular rim portion of said dished blank before said step of cold forming is at least 1.6; and
   (b) the quotient of a thinnest portion of a tooth flank wall of the fabricated rim gear divided by said predeterminate wall thickness of said substantially tubular rim portion of said dished blank before said step of cold forming is at most 0.4.

* * * * *